US011850835B2

(12) United States Patent
Simpson et al.

(10) Patent No.: US 11,850,835 B2
(45) Date of Patent: Dec. 26, 2023

(54) PRODUCTION OF COMPOSITE MATERIALS MADE OF FILM, SOLID ADHESIVE POLYMER, AND A POLYURETHANE LAYER

(71) Applicant: BASF Coatings GmbH, Muenster (DE)

(72) Inventors: Paul Andrew Simpson, Ludwigshafen (DE); Detlef Pfeifer, Ludwigshafen (DE); Yves Stiwitz, Ludwigshafen (DE)

(73) Assignee: BASF COATINGS GMBH, Muenster (DE)

( * ) Notice: Subject to any disclaimer, the term of this patent is extended or adjusted under 35 U.S.C. 154(b) by 716 days.

(21) Appl. No.: 16/640,400

(22) PCT Filed: Aug. 14, 2018

(86) PCT No.: PCT/EP2018/071991
§ 371 (c)(1),
(2) Date: Feb. 20, 2020

(87) PCT Pub. No.: WO2019/038129
PCT Pub. Date: Feb. 28, 2019

(65) Prior Publication Data
US 2020/0353738 A1   Nov. 12, 2020

(30) Foreign Application Priority Data

Aug. 24, 2017 (EP) .................................... 17187656

(51) Int. Cl.
| | | |
|---|---|---|
| B32B 37/12 | (2006.01) | |
| B29C 65/48 | (2006.01) | |
| B29C 65/00 | (2006.01) | |
| B32B 3/26 | (2006.01) | |
| B32B 7/12 | (2006.01) | |
| B32B 27/06 | (2006.01) | |
| B32B 27/34 | (2006.01) | |
| B32B 27/40 | (2006.01) | |
| B32B 37/18 | (2006.01) | |
| C08J 5/18 | (2006.01) | |
| B29K 75/00 | (2006.01) | |
| B29L 9/00 | (2006.01) | |

(52) U.S. Cl.
CPC ............ *B32B 37/12* (2013.01); *B29C 65/486* (2013.01); *B29C 65/4815* (2013.01); *B29C 66/1122* (2013.01); *B29C 66/45* (2013.01); *B29C 66/712* (2013.01); *B29C 66/73921* (2013.01); *B32B 3/266* (2013.01); *B32B 7/12* (2013.01); *B32B 27/065* (2013.01); *B32B 27/34* (2013.01); *B32B 27/40* (2013.01); *B32B 37/185* (2013.01); *C08J 5/18* (2013.01); *B29K 2075/00* (2013.01); *B29K 2883/00* (2013.01); *B29L 2009/00* (2013.01); *B32B 2250/24* (2013.01); *B32B 2307/718* (2013.01); *C08J 2375/04* (2013.01); *C08J 2377/00* (2013.01)

(58) Field of Classification Search
CPC ... B29C 65/4815; B29C 65/486; B29C 65/50; B29C 65/5028; B29C 65/5027; B29C 66/1122; B29C 66/45; B29C 66/71; B29C 66/712; B29C 66/73921; B29K 2075/00; B29K 2883/00; B29L 2009/00; B32B 2250/24; B32B 2307/718; B32B 2307/732; B32B 27/065; B32B 27/08; B32B 27/34; B32B 27/40; B32B 3/266; B32B 37/12; B32B 37/185; B32B 7/12; C08J 2375/04; C08J 2377/00; C08J 5/18
USPC ... 156/60, 196, 212, 242, 245, 272.2, 272.8, 156/290, 291, 307.1, 308.2, 308.4, 309.6, 156/331.7, 331.9, 332, 334
See application file for complete search history.

(56) References Cited

U.S. PATENT DOCUMENTS

| | | | | |
|---|---|---|---|---|
| 5,494,723 A | * | 2/1996 | Erren ..................... | D05C 17/02 428/95 |
| 8,324,318 B2 | | 12/2012 | Derudder | |
| 2004/0023026 A1 | * | 2/2004 | Rambaud ................... | C09J 7/22 428/116 |
| 2004/0175593 A1 | * | 9/2004 | Davis ..................... | B32B 27/36 428/515 |
| 2005/0008813 A1 | * | 1/2005 | Demott .................. | B32B 27/40 442/403 |
| 2005/0233107 A1 | * | 10/2005 | Hartman .............. | D05C 17/023 428/95 |
| 2006/0280902 A1 | * | 12/2006 | Otteson .................... | B32B 5/26 428/95 |
| 2009/0029097 A1 | * | 1/2009 | Riddle ............... | C08G 18/2815 428/221 |
| 2009/0054821 A1 | | 2/2009 | Tanaka et al. | |
| 2009/0304964 A1 | * | 12/2009 | Sachs ..................... | B65D 51/20 428/317.1 |
| 2010/0316833 A1 | * | 12/2010 | Jokisch .................. | B32B 15/20 428/209 |
| 2012/0138219 A1 | | 6/2012 | Simpson et al. | |
| 2015/0183383 A1 | * | 7/2015 | Park ...................... | B32B 27/065 181/290 |
| 2015/0266262 A1 | * | 9/2015 | Hill ........................ | B32B 38/10 156/247 |

(Continued)

FOREIGN PATENT DOCUMENTS

| | | |
|---|---|---|
| EP | 2933089 A1 | 10/2015 |
| JP | S59115900 A | 7/1984 |

(Continued)

OTHER PUBLICATIONS

English Translation of International Search Report for corresponding International App. No. PCT/EP2018/071991, dated Oct. 24, 2018, 2 pages.

*Primary Examiner* — Philip C Tucker
*Assistant Examiner* — Brian R Slawski
(74) *Attorney, Agent, or Firm* — Armstrong Teasdale LLP

(57) ABSTRACT

Provided herein is a process for the preparation of multi-layered composite materials, and also multilayered composite materials which can be obtained according to this process.

13 Claims, No Drawings

(56) References Cited

U.S. PATENT DOCUMENTS

| | | | | |
|---|---|---|---|---|
| 2015/0290913 A1* | 10/2015 | Hohberg | ................... | C09J 5/00 156/87 |
| 2017/0145630 A1* | 5/2017 | Batenburg | .......... | B32B 37/1207 |
| 2017/0348953 A1* | 12/2017 | Takamatsu | ................ | B32B 7/12 |

FOREIGN PATENT DOCUMENTS

| | | | |
|---|---|---|---|
| JP | S6151328 A | 3/1986 | |
| JP | H06143479 A | 5/1994 | |
| JP | 2006082512 A | 3/2006 | |
| JP | 2011527725 A | 11/2011 | |
| WO | 2003064153 A1 | 8/2003 | |
| WO | 2007114295 A1 | 10/2007 | |
| WO | 2009106500 A1 | 9/2009 | |
| WO | 2012072740 A1 | 6/2012 | |
| WO | 2016178169 A1 | 11/2016 | |
| WO | WO-2016178169 A1 * | 11/2016 | ............. B32B 23/08 |

\* cited by examiner

PRODUCTION OF COMPOSITE MATERIALS MADE OF FILM, SOLID ADHESIVE POLYMER, AND A POLYURETHANE LAYER

CROSS-REFERENCE TO RELATED APPLICATIONS

This application is a U.S. National Phase Application of PCT/EP2018/071991, filed Aug. 14, 2018, which claims the benefit of priority to European Application No. 17187656.8, filed Aug. 24, 2017, the contents of which are hereby expressly incorporated by reference in their entirety.

DESCRIPTION

The present invention relates to a process for the preparation of multilayered composite materials, and also to multilayered composite materials which can be obtained according to this process.

Plastic films are necessary in many applications, for example in wrappings. Their mechanical properties, their appearance and their feel are in great demand in some applications. Thus, for example, highly transparent plastic films are very popular as wrapping materials for articles such as shirts, cigarettes, greetings cards, books or table-cloths.

Films made of plastic are particularly important in the production of electrical appliances, for example cell phones, in particular because they can be thermoformed and extremely easily adapted to the shape of the relevant appliance.

WO 2009/106500 describes composite materials made of films with a polyurethane layer and the preparation thereof.

The object was to make available processes which make possible the preparation of multilayered composite systems. The composite systems should exhibit a better adhesion of the layers than known composite systems.

The subject matter of the invention is a process for the preparation of multilayered composite materials comprising:
(A) a film based on polyurethane or polyamide,
(B) a tie layer made of thermoplastic adhesive polymer with a melting range from 70° C. to 130° C., and
(C) a polyurethane layer,
wherein
a) the polyurethane layer (C) is formed using a mold,
b) the adhesive polymer is applied in solid form to the film (A) and/or to polyurethane layer (C), and
c) the polyurethane layer (C) is combined with the film (A).

The invention further provides a multilayered composite material comprising:
(A) a film made of polyurethane or polyamide,
(B) a tie layer made of thermoplastic adhesive polymer with a melting range from 70° C. to 130° C., and
(C) a polyurethane layer,
which can be obtained by the process according to the invention.

Processes according to the invention generally use a flat substrate as film (A). Flat substrates are in the context of the present invention those whose expansion in two dimensions is much greater than in the third dimension; for example, width and length of flat substrate, in particular film (A), can each exceed the thickness by at least a factor of 100 and preferably by at least a factor of 1000. In one embodiment, length and/or width of film (A) exceed the thickness by a factor of up to 1 000 000. Length and width of film (A) can in each case be identical or, preferably, different. For example, the length of film (A) can exceed the width by a factor of 1.1 up to 100.

In one embodiment of the present invention, the length of film (A) lies in the range from 50 cm to 100 m, preferably up to 50 m, particularly preferably up to 10 m. In one embodiment of the present invention, the width of film (A) lies in the range from 10 cm to 5 m, preferably up to 2 m.

In one embodiment of the present invention, the thickness of film (A) lies in the range from 50 nm to 2 mm, preferably from 1 µm to 500 µm and in particular from 20 µm to 300 µm.

In one embodiment, film (A) is an "endless material", which generally is deployed wound up and is used in a continuous process. In this connection, the length of the wound-up film (A) many times exceeds the width thereof.

Film (A) can preferably be bent manually, that is without the assistance of a tool.

In one embodiment of the present invention, flat substrate, in particular film (A), exhibits an E-modulus in the range from 200 to 5000 $N/mm^2$, which can be determined, for example, according to DIN 53455. Flat substrates, in particular films, with an E-modulus in the range from 200 to 1000 $N/mm^2$, which, for example, predominantly comprise polyethylene (HDPE or LDPE), in the range from 1000 to 3500 $N/mm^2$, which, for example, predominantly comprise unplasticized PVC, or in the range from 4000 to 4500 $N/mm^2$, which predominantly comprise PET, are suitable in particular.

The film can comprise additives. Suitable additives can, for example, be chosen from plasticizers, impact modifiers, stabilizers, colorants, fillers, reinforcing materials, flame retardants, light stabilizers and waxes.

Films (A) can exhibit a weight per unit area in the range from 10 to 3000 $g/m^2$; from 50 to 300 $g/cm^2$ are preferred.

Suitable films (A) are based on polyurethane or polyamide. The film for the most part comprises at least 50% by weight, preferably at least 80% by weight and in particular at least 90% by weight of the polymer (such as polyurethane or polyamide). In a preferred form, the film is based on polyurethane, in particular thermoplastic polyurethane. In a preferred form, the film is based on polyamide. The film is preferably made of thermoplastic polyurethane or aliphatic polyamide.

The film can be constructed by combining individual films. The expression, that the film is based on a polymer, refers, with composite films, to the individual film which forms the surface of the composite film.

Suitable polyamides for the film are aliphatic, partially aromatic and aromatic polyamides, aliphatic polyamides being preferred. Homo- and copolyamides are suitable.

Suitable partially aromatic polyamides are PA 6T made of hexamethylenediamine and terephthalic acid (PA 6T).

Suitable aromatic polyamides are based on para-phenylenediamine and terephthalic acid.

Suitable aliphatic polyamides are based on monomers such as caprolactam, hexamethylenediamine, adipic acid and sebacic acid.

Examples of polyamides are PA 6/66 made of caprolactam, hexamethylenediamine and adipic acid, PA 66/610 made of hexamethylenediamine, adipic acid and sebacic acid, PA 6.6 made of hexamethylenediamine and adipic acid, and PA 6 made of caprolactam.

The polyamide is in particular PA 6/66 made of caprolactam, hexamethylenediamine and adipic acid.

Suitable polyurethanes for the film are such as described subsequently for the polyurethane layer (C), preferably the thermoplastic polyurethanes described subsequently.

Preferred polyurethanes for the films are polyester polyurethanes or polyether polyurethanes. Polyester polyurethanes, in particular aromatic polyester polyurethanes, are particularly preferred.

Suitable polyurethanes for the films are normally free from plasticizers and/or from solvents. Suitable polyurethanes for the films for the most part have a softening point of 80° C. to 120° C.

The composite material comprises a tie layer (B) of thermoplastic adhesive polymer with a melting range of 70° C. to 130° C. Tie layer (B) can, for example, be a distinct layer which is perforated, which means that the surface is not completely intact, preferably a cured organic adhesive.

In one embodiment, tie layer (B) exhibits a thickness in the range from one to a maximum of 100 μm, preferably to 50 μm, particularly preferably to 15 μm.

The adhesive polymer is applied in solid form to the film (A) and/or to polyurethane layer (C).

The adhesive polymer in stage b) for the most part has a weight per unit area of 0.1 to 1000 g/m$^2$, preferably of 1 to 300 g/m$^2$ and in particular of 5 to 100 g/m$^2$.

The adhesive polymer in stage b) for the most part has a melt volume-flow rate MVR of 1 to 500 cm$^3$/10 min, preferably of 5 to 200 cm$^3$/10 min and in particular of 10 to 100 cm$^3$/10 min. The melt volume-flow rate MVR can be measured at 160° C. and 2.16 kg according to ISO 1133-1.

The adhesive polymer preferably has a melting range from 80° C. to 125° C. and in particular from 85° C. to 120° C. The melting range can be determined by means of DSC, e.g. according to ISO 11357.

The adhesive polymer can be applied in stage b) in the form of an adhesive grid, adhesive web or adhesive film.

Adhesive grids can exhibit round or angular (such as square, triangular or hexagonal) openings.

Adhesive webs can comprise fibers which are irregularly assembled.

Adhesive films can form a sheet with a completely intact surface, which usually has no openings.

The adhesive polymers are commercially available in solid form, for example as adhesive grid, adhesive web or adhesive film, such as from AB-Tec GmbH & Co. KG, Iserlohn, Germany; Spunfab Ltd., Cuyahoga Falls, USA; or Protechnic S.A., Cernay, France.

The adhesive polymer can be based on polyurethanes, polyamides, polyesters or polyolefins.

Suitable polyurethanes for the adhesive polymers are such as described subsequently for the polyurethane layer (C), preferably the thermoplastic polyurethanes described subsequently, in particular aliphatic thermoplastic polyurethanes.

Suitable polyamides are copolyamides.

Suitable polyesters are polyethylene terephthalate (PET) and PET copolymers.

Suitable polyolefins are polyethylenes (such as low density polyethylene (LDPE), linear low density polyethylene (LLDPE), medium density polyethylene (MDPE), linear medium density polyethylene (LMDPE), linear very-low density polyethylene (VLDPE), linear ultra-low density polyethylene (ULDPE), high density polyethylene (HDPE)) and copolymers of polyethylene. Examples of copolymers of polyethylene are ethylene/vinyl acetate, ethylene/vinyl alcohol, ethylene/octene or ethylene/acrylic acid, such as described, e.g., in WO2003064153.

In one embodiment, tie layer (B), as also layer (C), can optionally comprise one or more additives, for example one or more flame retardants, stabilizers, such as antioxidants, light stabilizers and/or water repellents or oil repellents.

Suitable flame retardants are, for example, inorganic flame retardants, halogenated organic compounds, organic phosphorus compounds or halogenated organic phosphorus compounds.

Suitable inorganic flame retardants are, for example, phosphates, such as ammonium phosphates, aluminum hydroxides, alumina trihydrates, zinc borates or antimony oxide.

Suitable halogenated organic compounds are, for example, chloroparaffins, polychlorinated biphenyls, hexabromobenzene, polybrominated diphenyl ethers (PBDE) and other bromine compounds, addition products of hexachlorocyclopentadiene, e.g. with cyclooctadiene, tetrabromobisphenol A, tetrabromophthalic anhydride, dibromoneopentyl glycol.

Suitable organic phosphorus compounds are, for example, organic phosphates, phosphites and phosphonates, such as, for example, tricresyl phosphate and tert-butylphenyl diphenyl phosphate.

Suitable halogenated organic phosphorus compounds are, for example, tris(2,3-dibromopropyl) phosphate, tris(2-bromo-4-methylphenyl) phosphate and tris(2-chloroisopropyl) phosphate.

Preferred flame retardants are, for example, polyvinyl chlorides or polyvinylidene chlorides, as well as copolymers of vinylidene chloride with (meth)acrylic acid esters. Such products are, for example, sold under the trade name Diofan®.

Suitable light stabilizers are, for example, radical traps, such as sterically hindered organic amines (HALS), or peroxide decomposers, such as, for example, benzotriazoles, such as 2-(2-hydroxyphenyl)-2H-benzotriazoles (BTZ) or hydroxybenzophenones (BP). Additional suitable light stabilizers are, for example, (2-hydroxyphenyl)-s-triazines (HPT), oxalanilides or non-pigmentary titanium dioxide. Suitable light stabilizers are available, for example, under the trade names Irganox®, Irgastab® or Tinuvin®. Preferred light stabilizers are HALS compounds.

Thermoplastic polyurethanes are suitable as polyurethane layer (C). Suitable polyurethanes are all thermoplastic polyurethanes which can be provided in the form preferably of aqueous dispersions. They preferably have a glass transition temperature of less than 0° C., determined, for example, by DSC (Differential Scanning Calorimetry) according to DIN 53765. Preferably, polymer layer (C) is essentially composed of polyurethane.

Polyurethanes (PU) are generally known and commercially available and generally consist of a soft phase of relatively high molecular weight polyhydroxyl compounds, e.g. of polycarbonate, polyester or polyether segments, and of a urethane hard phase formed of low molecular weight chain extenders and di- or polyisocyanates.

Processes for the preparation of polyurethanes (PU) are generally known. Generally, polyurethanes (PU) are prepared by reaction of
 (i) isocyanates, preferably diisocyanates, with
 (ii) compounds which react with isocyanates, usually with a molecular weight ($M_w$) of 500 to 10 000 g/mol, preferably 500 to 5000 g/mol, particularly preferably 800 to 3000 g/mol, and
 (iii) chain extenders with a molecular weight of 50 to 499 g/mol, optionally in the presence of
 (iv) catalysts
 (v) and/or normal additives.

In the following, the starting components and processes for the preparation of the preferred polyurethanes (PU) are to be explained by way of example. The components (i), (ii), (iii), and also optionally (iv) and/or (v), customarily used in the preparation of the polyurethanes (PU), are to be described below by way of example:

Use may be made, as isocyanates (i), of generally known aliphatic, cycloaliphatic, araliphatic and/or aromatic isocyanates, for example tri-, tetra-, penta-, hexa-, hepta- and/or octamethylene diisocyanate, 2-methyl-1,5-pentamethylene diisocyanate, 2-ethyl-1,4-butylene diisocyanate, 1,5-pentamethylene diisocyanate, 1,4-butylene diisocyanate, 1-isocyanato-3,3,5-trimethyl-5-(isocyanatomethyl)cyclohexane (isophorone diisocyanate, IPDI), 1,4- and/or 1,3-bis(isocyanatomethyl)cyclohexane (HXDI), 1,4-cyclohexane diisocyanate, 1-methyl-2,4- and/or -2,6-cyclohexane diisocyanate and/or 4,4'-, 2,4'- and/or 2,2'-dicyclohexylmethane diisocyanate, 2,2'-, 2,4'- and/or 4,4'-diphenylmethane diisocyanate (MDI), 1,5-naphthylene diisocyanate (NDI), 2,4- and/or 2,6-toluylene diisocyanate (TDI), 3,3'-dimethyldiphenyl diisocyanate, 1,2-diphenylethane diisocyanate and/or phenylene diisocyanate. 4,4'-MDI is preferably used. Aliphatic diisocyanates, in particular hexamethylene diisocyanate (HDI), are additionally preferred and aromatic diisocyanates, such as 2,2'-, 2,4'- and/or 4,4'-diphenylmethane diisocyanate (MDI) and mixtures of the abovementioned isomers are especially preferred.

Use may be made, as compounds which react with isocyanates (ii), of the generally known compounds which react with isocyanates, for example polyesterols, polyetherols and/or polycarbonate diols, which are normally also combined under the term "polyols", with molecular weights ($M_w$) in the range from 500 to 8000 g/mol, preferably 600 to 6000 g/mol and in particular 800 to 3000 g/mol, and preferably with an average functionality with regard to isocyanates of 1.8 to 2.3, preferably 1.9 to 2.2 and in particular 2. Use is preferably made of polyether polyols, for example those based on generally known starting substances and customary alkylene oxides, for example ethylene oxide, 1,2-propylene oxide and/or 1,2-butylene oxide, preferably polyetherols based on polyoxytetramethylene (poly-THF), 1,2-propylene oxide and ethylene oxide. Polyetherols exhibit the advantage that they have a greater stability to hydrolysis than polyesterols and are preferred as component (ii), in particular for the preparation of soft polyurethanes (PU1).

Mention may be made, as polycarbonate diols, of in particular aliphatic polycarbonate diols, for example 1,4-butanediol polycarbonate and 1,6-hexanediol polycarbonate.

Mention may be made, as polyester diols, of those which can be prepared by polycondensation of at least one primary diol, preferably at least one primary aliphatic diol, for example ethylene glycol, 1,4-butanediol, 1,6-hexanediol, neopentyl glycol or particularly preferably 1,4-di(hydroxymethyl)cyclohexane (as isomer mixture) or mixtures of at least two of the abovementioned diols, on the one hand, and at least one, preferably at least two, dicarboxylic acids or their anhydrides, on the other hand. Preferred dicarboxylic acids are aliphatic dicarboxylic acids, such as adipic acid, glutaric acid or succinic acid, and aromatic dicarboxylic acids, such as, for example, phthalic acid and in particular isophthalic acid.

Polyetherols are preferably prepared by addition of alkylene oxides, in particular ethylene oxide, propylene oxide and mixtures thereof, to diols, such as, for example, ethylene glycol, 1,2-propylene glycol, 1,2-butylene glycol, 1,4-butanediol or 1,3-propanediol, or to triols, such as, for example, glycerol, in the presence of highly active catalysts. Such highly active catalysts are, for example, cesium hydroxide and double metal cyanide catalysts, also described as DMC catalysts. A frequently used DMC catalyst is zinc hexacyanocobaltate. The DMC catalyst can be left in the polyetherol after the reaction; preferably, it is removed, for example by sedimentation or filtration.

Mixtures of different polyols can also be used instead of one polyol.

In order to improve the dispersability, use may also be made, as compounds which react with isocyanates (ii), of a proportion of one or more diols or diamines with a carboxylic acid group or sulfonic acid group (b), in particular alkali metal or ammonium salts of 1,1-dimethylolbutanoic acid, 1,1-dimethylolpropionic acid or

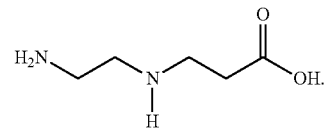

Use is made, as chain extenders (iii), of aliphatic, araliphatic, aromatic and/or cycloaliphatic compounds with a molecular weight of 50 to 499 g/mol and at least two functional groups, preferably compounds with exactly two functional groups per molecule, which are known per se, for example diamines and/or alkanediols with from 2 to 10 carbon atoms in the alkylene radical, in particular 1,3-propanediol, 1,4-butanediol, 1,6-hexanediol and/or di-, tri-, tetra-, penta-, hexa-, hepta-, octa-, nona- and/or decaalkylene glycols with from 3 to 8 carbon atoms per molecule, preferably corresponding oligo- and/or polypropylene glycols, it also being possible to use mixtures of chain extenders (iii).

The components (i) to (iii) are particularly preferably difunctional compounds, i.e. diisocyanates (i), difunctional polyols, preferably polyetherols, (ii) and difunctional chain extenders, preferably diols.

Suitable catalysts (iv), which in particular accelerate the reaction between the NCO groups of the diisocyanates (i) and the hydroxyl groups of the components (ii) and (iii), are tertiary amines, such as, e.g., triethylamine, dimethylcyclohexylamine, N-methylmorpholine, N,N'-dimethylpiperazine, 2-(dimethylaminoethoxy)ethanol, diazabicyclo[2.2.2]octane ("DABCO") and similar tertiary amines, as well as in particular organic metal compounds, such as titanic acid esters, iron compounds, such as, e.g., iron(III) acetylacetonate, tin compounds, e.g. tin diacetate, tin dioctoate, tin dilaurate or the dialkyltin salts of aliphatic carboxylic acids, such as dibutyltin diacetate, dibutyltin dilaurate or the like, which are known per se. The catalysts are normally used in amounts of 0.0001 to 0.1 parts by weight per 100 parts by weight of component (ii).

In addition to catalysts (iv), auxiliaries and/or additives (v) can be added to the components (i) to (iii). Mention may be made, for example, of blowing agents, antiblocking agents, surface-active substances, fillers, for example fillers based on nanoparticles, in particular fillers based on $CaCO_3$, furthermore, nucleating agents, slip agents, dyes and pigments, antioxidants, e.g. against hydrolysis, light, heat or discoloration, inorganic and/or organic fillers, reinforcing agents and plasticizers, or metal deactivators. In a preferred embodiment, the component (v) also includes hydrolysis stabilizers, such as, for example, polymeric and low molecular weight carbodiimides. The soft polyurethane preferably comprises triazole and/or triazole derivatives and antioxidants in an amount of 0.1 to 5% by weight, based on the total weight of the relevant soft polyurethane. Suitable as antioxidants are generally substances which hinder or prevent undesirable oxidative processes in the plastic to be protected. Generally, antioxidants are commercially available. Examples of antioxidants are sterically hindered phenols, aromatic amines, thiosynergists, organophosphorus compounds of trivalent phosphorus, and hindered amine light stabilizers. Examples of sterically hindered phenols are found in Plastics Additive Handbook, 5th edition, H. Zweifel, ed., Hanser Publishers, Munich, 2001 ([1]), pp. 98-107 and p. 116-p. 121. Examples of aromatic amines are found in [1] pp. 107-108. Examples of thiosynergists are given in [1], pp. 104-105 and pp. 112-113. Examples of phosphites are found in [1], pp. 109-112. Examples of hindered amine light stabilizers are given in [1], pp. 123-136. Phenolic antioxidants are preferably suitable for use in the antioxidant mixture. In a preferred embodiment, the antioxidants, in particular the phenolic antioxidants, exhibit a molar mass of greater than 350 g/mol, particularly preferably of greater than 700 g/mol, and with a maximum molar mass ($M_w$) up to a maximum of 10 000 g/mol, preferably up to a maximum of 3000 g/mol. Moreover, they preferably have a melting point of at most 180° C. Furthermore, use is preferably made of antioxidants which are amorphous or liquid. Likewise, mixtures of two or more antioxidants can also be used as component (v).

In addition to the components (i), (ii) and (iii) and optionally (iv) and (v) mentioned, use may also be made of chain regulators (chain terminators), usually with a molecular weight of 31 to 3000 g/mol. Such chain regulators are compounds which exhibit only one functional group which reacts with isocyanates, such as, e.g., monofunctional alcohols, monofunctional amines and/or monofunctional polyols. Flow behavior, in particular with soft polyurethanes, can be selectively adjusted through such chain regulators. Chain regulators can generally be used in an amount of 0 to 5 parts by weight, preferably 0.1 to 1 part by weight, based on 100 parts by weight of the component (ii), and fall under the definition of the component (iii).

In addition to the components (i), (ii) and (iii) and optionally (iv) and (v) mentioned, crosslinking agents with two or more groups which react with isocyanate can also be used toward the end of the synthesis reaction, for example hydrazine hydrate.

The components (ii) and (iii) can be chosen in relatively broad molar ratios in order to adjust the hardness of polyurethane (PU). Molar ratios of component (ii) to total chain extenders (iii) to be used of 10:1 to 1:10, in particular of 1:1 to 1:4, have proved to be worthwhile, the hardness of the soft polyurethanes increasing with increasing content of (iii). The reaction for the preparation of polyurethane (PU) can be carried out at an index of 0.8 to 1.4:1, preferably at an index of 0.9 to 1.2:1, particularly preferably at an index of 1.05 to 1.2:1. The index is defined by the ratio of the total isocyanate groups of the component (i) used in the reaction to the groups which react with isocyanates, i.e. the active hydrogens, of the components (ii) and optionally (iii) and optionally monofunctional components which react with isocyanates as chain terminators, such as, e.g., monoalcohols.

The preparation of polyurethane (PU) can, according to processes known per se, be carried out continuously, for example according to the one-shot or the prepolymer process, or batchwise, according to the prepolymer operation known per se. In these processes, the components (i), (ii), (iii) and optionally (iv) and/or (v) to be reacted can be mixed with one another successively or simultaneously, the reaction beginning immediately.

Polyurethane (PU) can be dispersed in water according to processes known per se, for example by dissolving polyurethane (PU) in acetone or preparing polyurethane as a solution in acetone, adding water and then removing the acetone, for example by distillation. In an alternative form, polyurethane (PU) is prepared as a solution in N-methylpyrrolidone or N-ethylpyrrolidone, water is added and the N-methylpyrrolidone or N-ethylpyrrolidone is removed.

In one embodiment of the present invention, aqueous dispersions according to the invention comprise two different polyurethanes, polyurethane (PU1) and polyurethane (PU2), of which polyurethane (PU1) is a "soft" polyurethane, which is constructed as described above as polyurethane (PU), and at least one hard polyurethane (PU2).

Hard polyurethane (PU2) can in principle be prepared analogously to soft polyurethane (PU1); however, other compounds (ii) which react with isocyanates or other mixtures of compounds (ii) which react with isocyanates are chosen, also described in the context of the present invention as compounds (ii-2) which react with isocyanates or in short compounds (ii-2).

Examples of compounds (ii-2) are in particular 1,4-butanediol, 1,6-hexanediol and neopentyl glycol, either in a mixture with one another or in a mixture with polyethylene glycol.

In an alternative form of the present invention, mixtures of diisocyanates, for example mixtures of HDI and IPDI, are each time chosen as diisocyanate (i) for polyurethane (PU2), larger proportions of IPDI being chosen for the preparation of hard polyurethane (PU2) than for the preparation of soft polyurethane (PU1).

In one embodiment of the present invention, polyurethane (PU2) exhibits a Shore A hardness in the range from over 60 up to at most 100, the Shore A hardness having been determined according to DIN 53505 after 3 s.

In one embodiment of the present invention, polyurethane (PU) exhibits an average particle diameter in the range from 100 to 300 nm, preferably 120 to 150 nm, determined by laser light scattering.

In one embodiment of the present invention, soft polyurethane (PU1) exhibits an average particle diameter in the range from 100 to 300 nm, preferably 120 to 150 nm, determined by laser light scattering.

In one embodiment of the present invention, polyurethane (PU2) exhibits an average particle diameter in the range from 100 to 300 nm, preferably 120 to 150 nm, determined by laser light scattering.

Polymer layer (C) is preferably a polyurethane layer, a PVC layer, a layer of an epoxy resin, a polyacrylate layer or a polybutadiene layer, particularly preferably a polyurethane layer. Polymer layer (C) is particularly preferably a polyurethane layer.

In one embodiment of the present invention, polymer layer (C) exhibits an average thickness in the range from 15 to 300 μm, preferably from 20 to 150 μm, particularly preferably from 25 to 80 μm.

In one embodiment of the present invention, polymer layer (C) exhibits, on average, at least 100, preferably at least 250 and particularly preferably at least 1000 capillaries per 100 $cm^2$.

In one embodiment of the present invention, the capillaries exhibit an average diameter in the range from 0.005 to 0.05 mm, preferably from 0.009 to 0.03 mm.

In one embodiment of the present invention, the capillaries are evenly distributed over polymer layer (C). In a preferred embodiment of the present invention, the capillaries, however, are unevenly distributed over the polymer layer (C).

In one embodiment of the present invention, the capillaries are essentially curved. In another embodiment of the present invention, the capillaries exhibit an essentially linear course.

The capillaries bestow permeability to air and to water vapor on the polymer layer (C), without perforation being necessary. In one embodiment of the present invention, the permeability to water vapor of the polymer layer (C) can be more than 1.5 mg/cm$^2$·h, measured according to DIN 53333. It is thus possible, for example, for liquids comprising an active compound to be able to migrate through the polymer layer (C).

In one embodiment of the present invention, polymer layer (C) even exhibits, in addition to the capillaries, pores which do not extend over the total thickness of the polymer layer (C).

In one embodiment, polymer layer (C), in particular polyurethane layer (C), exhibits a pattern. The pattern can be any pattern and, for example, can reproduce the pattern of a leather or of a wood surface. In one embodiment of the present invention, the pattern can reproduce a nubuck leather.

In one embodiment of the present invention, polymer layer (C), in particular polyurethane layer (C), exhibits a velvety appearance.

In one embodiment of the present invention, the pattern can correspond to a velvet surface, for example with small crinite features with an average length of 20 to 500 μm, preferably 30 to 200 μm and particularly preferably 60 to 100 μm. The small crinite features can, for example, exhibit a circular diameter. In a special embodiment of the present invention, the small crinite features have a conical shape.

In one embodiment of the present invention, polymer layer (C), in particular polyurethane layer (C), exhibits small crinite features which are arranged at an average distance of 50 to 350 μm, preferably 100 to 250 μm, from one another.

In case the polymer layer (C), in particular polyurethane layer (C), exhibits small crinite features, the statements refer, with regard to the average thickness, to the polymer layer (C), in particular polyurethane layer (C), without the small crinite features.

In other embodiments, polymer layer (C), in particular polyurethane layer (C), exhibits text, logos or pictures. In one embodiment, polymer layer (C), in particular polyurethane layer (C), exhibits complicated pictures, as are described in WO 2012/072740.

In a preferred embodiment, polymer layer (C), in particular polyurethane layer (C), is formed from an aqueous polymer dispersion, preferably polyurethane dispersion, which comprises at least one crosslinking agent C, the at least one crosslinking agent C being at least one polyisocyanate P which is blocked with at least one blocking agent BA.

In a particularly preferred embodiment of the invention, aqueous polymer/polyurethane dispersions for the preparation of tie layers (B) and/or polymer layer (C), in particular polyurethane layer (C), comprise from 0.1 to 5% by weight of dipropylene glycol dimethyl ether and/or 1,2-propanediol diacetate.

In a particularly preferred embodiment, suitable crosslinking agents C are added to the aqueous polymer/polyurethane dispersions as a 1 to 80% by weight solution in dipropylene glycol dimethyl ether and/or 1,2-propanediol diacetate, preferably as a 30 to 75% by weight solution in dipropylene glycol dimethyl ether and/or 1,2-propanediol diacetate.

In a particularly preferred embodiment, polyisocyanate crosslinking agents C are added to the aqueous polymer/polyurethane dispersions as a 30 to 75% by weight solution in dipropylene glycol dimethyl ether and/or 1,2-propanediol diacetate.

For the most part, layer (C) comprises at least one polyisocyanate P blocked with blocking agent BA. Suitable polyisocyanates P and blocking agents BA are described further above. The polyisocyanates P blocked with blocking agent BA present in the layers (C) can be identical or different.

The process according to the invention is usually carried out so that
a) the polyurethane layer (C) is formed using a mold,
b) the adhesive polymer is applied in solid form to the film (A) and/or to polyurethane layer (C), and
c) the polyurethane layer (C) is combined with the film (A).

Stage (a) can be carried out as follows.

The mold is preferably a silicone mold. Silicone molds are understood to mean, in the context of the present invention, those molds in the preparation of which at least one binder is used which exhibits at least one, preferably at least three, O—Si(R$^1$R$^2$)—O— groups per molecule. In this connection, R$^1$ and—if present—R$^2$ are different or, preferably, identical and are chosen from organic groups and preferably C$_1$-C$_6$-alkyl, in particular methyl.

In one embodiment of the present invention, the silicone mold is a silicone mold structured using laser engraving.

In another embodiment, the mold is a mold made of ethylene/propylene rubber (EPM) or ethylene/propylene/diene rubber (EPDM).

In one embodiment of the present invention, the mold made of EPM or EPDM is a mold structured using laser engraving.

An aqueous polymer dispersion (thus, for example, the polyurethane) is applied to a mold which is preheated and the water is allowed to evaporate.

The application of aqueous polymer dispersion to the mold can be carried out according to methods known per se, in particular by spraying, for example with a spray gun.

The mold exhibits a pattern, also known as structuring, which is produced, for example, by laser engraving or by molding.

If it is desired to structure the mold using laser engraving, it is preferable, before the laser engraving, to strengthen the laser-engraveable layer by heating (thermochemically), by irradiating with UV light (photochemically) or by irradiating with high energy radiation (actinically) or any combination thereof.

Subsequently, the laser-engraveable layer or the layer composite is applied to a cylindrical (temporary) backing, for example made of plastic, glass fiber-reinforced plastic, metal or foam, for example using adhesive tape, negative pressure, clamping devices or magnetic force, and engraved as described above. Alternatively, the plane layer or the layer composite can also be engraved as described above. Optionally, during the laser engraving operation, the laser-engraveable layer is washed using a rotary cylindrical washer or a continuous washer with a cleaning agent for removing engraving residues.

In the manner described, the mold can be prepared as a negative mold or as a positive mold.

In a first alternative form, the mold exhibits a negative structure, so that the coating which can be bonded to film (A) can be obtained directly by application of a liquid plastic material to the surface of the mold and subsequent solidification of the polymer.

In a second alternative form, the mold exhibits a positive structure, so that a negative mold is first prepared from the laser-structured positive mold by molding. The coating which can be bonded to a flat backing can subsequently be obtained from this negative mold by application of a liquid plastic material to the surface of the negative mold and subsequent solidification of the plastic material.

Preferably, structure elements having dimensions in the range from 10 to 500 µm are engraved in the mold. The structure elements can be formed as elevations or depressions. The structure elements preferably have a simple geometric shape and are, for example, circles, ellipses, squares, rhombuses, triangles and stars. The structure elements can form a regular or irregular screen. Examples are a classical dot screen or a stochastic screen, for example a frequency-modulated screen.

In one embodiment of the present invention, wells are incorporated in the mold in the structuring of the mold using a laser, which wells exhibit an average depth in the range from 50 to 250 µm and a center-to-center separation in the range from 50 to 250 µm.

For example, the mold can be engraved so that it exhibits "wells" (depressions) which exhibit a diameter in the range from 10 to 500 µm on the surface of the mold. The diameter on the surface of the mold is preferably from 20 to 250 µm and particularly preferably from 30 to 150 µm. The separation of the wells can, for example, be from 10 to 500 µm, preferably from 20 to 200 µm, particularly preferably up to 80 µm.

In one embodiment of the present invention, the mold preferably exhibits, in addition to a coarse surface structure, also a fine surface structure. Both coarse and fine structure can be produced by laser engraving. The fine structure can, for example, be a microroughness with a roughness amplitude in the range from 1 to 30 µm and a roughness frequency of 0.5 to 30 µm. The dimensions of the microroughness are preferably in the range from 1 to 20 µm, particularly preferably from 2 to 15 µm and particularly preferably from 3 to 10 µm.

IR lasers are suitable in particular for laser engraving. However, it is also possible to use lasers with shorter wavelengths, provided that the laser exhibits a satisfactory intensity. For example, a frequency-doubled (532 nm) or frequency-tripled (355 nm) Nd-YAG laser can be used, or also an excimer laser (e.g. 248 nm). A $CO_2$ laser with a wavelength of 10 640 nm can, for example, be used for the laser engraving. Lasers with a wavelength of 600 to 2000 nm are particularly preferably used. For example, Nd-YAG lasers (1064 nm), IR diode lasers or solid-state lasers can be used. Nd/YAG lasers are particularly preferred. The image information to be engraved is transferred directly from the layout computer system to the laser apparatus. The laser can be operated either continuously or in pulsed mode.

As a rule, the mold obtained can be used directly after it has been prepared. If desired, the mold obtained can still be cleaned subsequently. Layer constituents which have been loosened but possibly still not completely removed from the surface are removed by such a cleaning stage. As a rule, simple treatment with water, water/surfactant, alcohols or inert organic cleaning agents, which are preferably low-swelling, is sufficient.

In an additional stage, an aqueous formulation of polymer is applied to the mold. Application can preferably be carried out by spraying. The mold should be heated, if the formulation of polymer is applied, for example to temperatures of at least 80° C., preferably at least 90° C. The water from the aqueous formulation of polymer evaporates and forms the capillaries in the solidifying polymer layer.

Aqueous is understood to mean, in connection with the polymer dispersion, that it comprises water but less than 5% by weight, based on the dispersion, preferably less than 1% by weight, of organic solvent. Particularly preferably, no volatile organic solvent can be detected. Volatile organic solvents are understood to mean, in the context of the present invention, those organic solvents which, at standard pressure, exhibit a boiling point of up to 200° C.

In one embodiment of the present invention, aqueous polymer dispersion comprises at least one additive chosen from pigments, delustrants, light stabilizers, flame retardants, antioxidants, antistatics, antisoiling agents, antisqueak agents, thickening agents, in particular thickening agents based on polyurethanes, water repellents, oil repellents and hollow microspheres. In one embodiment of the present invention, aqueous polymer dispersion comprises in total up to 20% by weight of additives.

Aqueous polymer dispersion can additionally comprise one or more organic solvents. Suitable organic solvents are, for example, alcohols, such as ethanol or isopropanol and in particular glycols, diglycols, triglycols or tetraglycols and glycols, diglycols, triglycols or tetraglycols dialkoxylated or preferably monoalkoxylated with $C_1$-$C_4$-alkyl. Examples of suitable organic solvents are ethylene glycol, propylene glycol, butylene glycol, diethylene glycol, triethylene glycol, tetraethylene glycol, dipropylene glycol, 1,2-dimethoxyethane, methyl triethylene glycol ("methyl triglycol") and triethylene glycol n-butyl ether ("butyl triglycol").

In one embodiment of the invention, aqueous polymers, in particular polyurethane dispersions, do not comprise any propylene carbonate.

In a preferred embodiment, polyurethane layer (C) is formed from an aqueous polyurethane dispersion, which optionally comprises at least one crosslinking agent C, the at least one crosslinking agent C being at least one polyisocyanate P which is optionally blocked with at least one blocking agent BA, as are defined above.

In one embodiment of the invention, aqueous polyurethane dispersions for the preparation of polymer layer (C) comprise from 0.1 to 5% by weight of dipropylene glycol dimethyl ether and/or 1,2-propanediol diacetate. In a particularly preferred embodiment, suitable crosslinking agents C are added, as 1 to 80% by weight solution in dipropylene glycol dimethyl ether and/or 1,2-propanediol diacetate, preferably as 30 to 75% by weight solution in dipropylene glycol dimethyl ether and/or 1,2-propanediol diacetate, to the aqueous polyurethane dispersions for the preparation of the at least one polymer layer (C). In a particularly preferred embodiment, polyisocyanate crosslinking agents C are added, as 30 to 75% by weight solution in dipropylene glycol dimethyl ether and/or 1,2-propanediol diacetate, to the aqueous polyurethane dispersions for the preparation of the at least one polymer layer (C).

After the curing of the polyurethane layer (C), it is separated from the mold, for example by stripping, and a polymer film is obtained which forms, in the multilayered composite system according to the invention, the polymer layer (C).

In a preferred embodiment of the present invention, the mold can also be allowed to act as protective layer and it can be removed only after the preparation of the actual multilayered composite system.

In stage (b), the adhesive polymer is applied in solid form to the film (A) and/or to the polyurethane layer (C).

The adhesive polymer in solid form (such as of the adhesive grid, adhesive web or adhesive film) can be applied according to methods known per se, in particular by putting on or pressing on. Application can be carried out continuously or batchwise. The adhesive polymer in solid form can be provided as wound-up product.

In another form, the adhesive polymer is applied in solid form to the polyurethane layer (C).

In another form, the adhesive polymer is applied in solid form to the film (A) and to the polyurethane layer (C).

In a preferred form, the adhesive polymer is applied in solid form to the film (A).

In stage (c), the polyurethane layer (C) is combined with the film (A).

Usually, the polyurethane layer (C) is combined with the film (A) so that the layer(s) of adhesive polymer come to lie between polyurethane layer (C) and film (A).

The adhesive polymer is for the most part cured, for example thermally, through actinic radiation or through aging, and multilayered composite material according to the invention is obtained. The curing is preferably carried out thermally.

It is also possible to compress the composite system, for example using a calender. Suitable contact pressures can be in the range from 1 to 20 bar, preferably 1.5 to 10 bar and in particular 2 to 5 bar. Suitable contact times can be in the range from 10 seconds to 100 min, preferably 30 seconds to 30 min and in particular 1 to 10 min. Suitable contact temperatures can be in the range from 80° C. to 160° C., preferably 90° C. to 150° C. and in particular 100° C. to 140° C.

The multilayered composite materials which have been prepared according to the process according to the invention exhibit various advantages:

They have agreeable visual and haptical properties and show surprisingly good mechanical properties, such as rubbing fastnesses or buckling strengths. In addition, they exhibit good functional properties and can be satisfactorily cleaned, for example by mechanical cleaning or chemical cleaning, for example using supercritical carbon dioxide or organic solvents, such as hydrocarbons or halogenated hydrocarbons. In particular, they exhibit superior storage and aging properties, in particular hot light aging properties, and hydrolysis properties. In addition, composite materials which have been prepared according to the process according to the invention exhibit a very constant quality, since the aqueous polymer dispersions used have a long shelf life. Additionally, it has been shown that composite materials which have been prepared according to the process according to the invention were, after the preparation, immediately adhesive-free and could, after the preparation, be very quickly stacked, wound up or otherwise stored.

EXAMPLES

TPU film 1: colorless transparent film of thermoplastic polyurethane based on aromatic polyester polyurethane, density 1.21 g/cm$^3$ (DIN 53479), melting range 140° C.-155° C. (Kofler bank at thickness of 50 μm), Shore A hardness of raw material ca 86 (DIN 53505), tensile strength longitudinal/transverse 45 MPa, elongation at break longitudinal/transverse 490% (DIN EN ISO 527-1, -3), commercially available as "Thermoplastische Polyurethanfolie 4119 [thermoplastic polyurethane film 4119]" from Gerlinger Industries, Nordlingen, Germany.

TPU film 2: colorless opaque film of thermoplastic polyurethane based on aromatic polyester polyurethane, density 1.19 g/cm$^3$ (DIN 53479), melting range 165° C.-175° C. (Kofler bank at thickness of 50 μm), Shore A hardness of raw material ca 86 (DIN 53505), tensile strength longitudinal/transverse 40 MPa, elongation at break longitudinal/transverse 500% (DIN EN ISO 527-1, -3), commercially available as "Thermo-plastische Polyurethanfolie 4120 [thermoplastic polyurethane film 4120]" from Gerlinger Industries, Nordlingen, Germany.

TPU film 3: Film of thermoplastic polyurethane, thickness 150 μm, melting point ca 120° C., commercially available.

Polyamide film 1: colorless polyamide film made of caprolactam, hexamethylenediamine and adipic acid (copolyamide 6/66), melting point approximately 190° C.

Adhesive A: White web of a copolyester, weight per unit area 8-60 g/m$^2$, melting range of 87° C.-97° C., melt volume-flow rate MVR of 51 to 100 cm$^3$/10 min, commercially available from Protechnic S.A., Cernay, France.

Adhesive B: White web of a copolyamide, weight per unit area 8-60 g/m$^2$, melting range of 98° C.-108° C., melt volume-flow rate MVR of 19 to 50 cm$^3$/10 min, commercially available from Protechnic S.A., Cernay, France.

Adhesive C: White web of an aliphatic thermoplastic polyurethane polyester, weight per unit area 12-70 g/m$^2$, melting range of 105° C.-115° C., melt volume-flow rate MVR of 51 to 100 cm$^3$/10 min, commercially available from Protechnic S.A., Cernay, France.

The melting range was determined by means of DSC according to ISO11357. The melt volume-flow rate MVR was measured at 160° C. and 2.16 kg according to ISO 1133-1.

Velure® PToM: aqueous anionic polyurethane dispersion, 31-38 wt % solids content, pH 6-8.5, efflux time 10-20 s (DIN53211, 4 mm at 20° C.).

Pigment: aqueous black pigment preparation, commercially available from BASF SE as Luconyl® NG Black 0066.

Velure® Härter 50-70 wt % solution of polyfunctional oligomeric isocyanate based

[curing agent] CI: on 1,6-hexamethylene diisocyanate, commercially available from BASF SE.

General Preparation Process:

Stage a)

A silicone mold with a desired pattern was prepared according to the state of the art.

A polyurethane layer was formed on the mold by spraying the hot mold with the aqueous polyurethane dispersion comprising Valure® PToM, Valure® Härter CI and pigment according to the state of the art.

Stage b)

The adhesive A, B or C was cut out to the size of the film and put on the film by hand.

Stage c)

The polyurethane layer was stripped from the mold and combined with the film on which the adhesive lies, so that the adhesive is between polyurethane layer and film.

The composite material thus obtained was compressed at 130° C.-135° C. for 3 or 5 minutes at a pressure of 3 mPa.

Examples 1-9: Composite Material on TPU Films

Multilayered composite material based on TPU film (TPU film 1, TPU film 2 and TPU film 3) was produced according to the general preparation process.

The adhesion of the layers in the composite material was tested manually and qualitatively evaluated. The results are summarized in Table 1.

TABLE 1

| Example | Film | Adhesive | Adhesion at 3 min compression | Adhesion at 5 min compression |
|---|---|---|---|---|
| 1 | TPU film 1 | A | very good | very good |
| 2 | TPU film 1 | B | very good | very good |
| 3 | TPU film 1 | C | very good | very good |
| 4 | TPU film 2 | A | very good | very good |
| 5 | TPU film 2 | B | very good | very good |
| 6 | TPU film 2 | C | very good | very good |
| 7 | TPU film 3 | A | very good | very good |
| 8 | TPU film 3 | B | very good | very good |
| 9 | TPU film 3 | C | very good | very good |

Example 10: Composite Material on Polyamide Film

Multilayered composite material based on polyurethane film 1 and adhesive A was produced according to the general preparation process and the adhesion was tested as in Examples 1-9. The adhesion was very good.

The invention claimed is:

1. A process for preparation of multilayered composite materials comprising:
   (A) a film made of polyurethane or polyamide,
   (B) a tie layer made of thermoplastic adhesive polymer with a melting range from 70° C. to 130° C., and
   (C) a polyurethane layer,
   wherein the process comprises:
   a) forming the polyurethane layer (C) using a mold,
   b) applying the adhesive polymer in solid form to the film (A) and/or to the polyurethane layer (C), and
   c) combining the polyurethane layer (C) with the film (A).

2. The process according to claim 1, wherein the film (A) is made of thermoplastic polyurethane or of aliphatic polyamide.

3. The process according to claim 1, wherein the film (A) is made of thermoplastic polyurethane.

4. The process according to claim 1, wherein the film (A) has a thickness of 1 to 500 μm.

5. The process according to claim 1, wherein the adhesive polymer in stage b) has a weight per unit area of 5 to 100 g/m².

6. The process according to claim 1, wherein the adhesive polymer in stage b) has a melt volume-flow rate MVR of 10 to 100 cm³/10 min.

7. The process according to claim 1, wherein, in stage b), the adhesive polymer is applied in the form of an adhesive grid, adhesive web, or adhesive film.

8. The process according to claim 1, wherein the adhesive polymer has a melting range of 80° C. to 125° C.

9. The process according to claim 1, wherein the adhesive polymer is based on polyurethanes, polyamides, polyesters or polyolefins.

10. The process according to claim 1, wherein the polyurethane layer (C) exhibits a pattern.

11. The process according to claim 1, wherein the tie layer (B) is a perforated layer of a cured adhesive polymer.

12. The process according to claim 1, wherein the mold is a silicone mold structured using laser engraving.

13. The process according to claim 1, wherein wells are incorporated in the mold in structuring of the mold using a laser, and wherein the wells exhibit an average depth in a range from 50 to 250 μm and a center-to-center separation in a range from 50 to 250 μm.

* * * * *